United States Patent
Iwasaki et al.

(10) Patent No.: US 8,829,350 B2
(45) Date of Patent: Sep. 9, 2014

(54) CROSSLINKED RESIN COMPOSITION, AND WIRE, CABLE AND MOLDED WIRE COATED WITH THE SAME

(75) Inventors: Makoto Iwasaki, Hitachi (JP); Akinari Nakayama, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 368 days.

(21) Appl. No.: 13/423,172

(22) Filed: Mar. 17, 2012

(65) Prior Publication Data
US 2012/0318557 A1 Dec. 20, 2012

(30) Foreign Application Priority Data

Jun. 15, 2011 (JP) .................... 2011-133221
Feb. 3, 2012 (JP) .................... 2012-021759

(51) Int. Cl.
| | | |
|---|---|---|
| *H01B 9/02* | (2006.01) | |
| *C08K 5/00* | (2006.01) | |
| *H01B 7/29* | (2006.01) | |
| *H01B 7/295* | (2006.01) | |
| *C08L 75/04* | (2006.01) | |
| *C08K 5/523* | (2006.01) | |
| *H01B 7/02* | (2006.01) | |

(52) U.S. Cl.
CPC .............. *C08K 5/0025* (2013.01); *C08L 75/04* (2013.01); *H01B 7/292* (2013.01); *C08K 5/523* (2013.01); *H01B 7/0216* (2013.01); *H01B 7/295* (2013.01); *C08L 2201/02* (2013.01); *C08L 2203/202* (2013.01)
USPC .............. 174/110 R; 174/113 R; 174/120 R; 174/121 A

(58) Field of Classification Search
CPC .............. H01B 1/00; H01B 3/00; H01B 5/00; H01B 7/00; H01B 9/00; H01B 11/00; H01B 12/00; H01B 13/00; H01B 15/00; H01B 17/00; H01B 19/00; C08L 1/00; C08L 7/00; C08L 23/00; C08L 59/00; C08L 89/00
USPC .... 174/110 R, 113 R, 120 R, 120 SR, 121 R, 174/121 SR, 121 A
See application file for complete search history.

(56) References Cited

U.S. PATENT DOCUMENTS

| | | | |
|---|---|---|---|
| 3,970,716 A * | 7/1976 | Evers et al. ............... | 524/84 |
| 5,274,023 A * | 12/1993 | Takahashi et al. .......... | 524/425 |
| 6,242,097 B1 * | 6/2001 | Nishiguchi et al. ......... | 428/383 |
| 7,518,064 B2 * | 4/2009 | Morioka et al. ........ | 174/120 R |
| 2008/0105454 A1 | 5/2008 | Morioka et al. | |
| 2010/0147549 A1 * | 6/2010 | Shiina .................. | 174/113 C |

FOREIGN PATENT DOCUMENTS

| | | | | |
|---|---|---|---|---|
| JP | 2007-095439 | * | 4/2007 | ........... H01B 7/02 |
| WO | 2005013291 A1 | | 3/2007 | |

* cited by examiner

*Primary Examiner* — William H Mayo, III
(74) *Attorney, Agent, or Firm* — Roberts Mlotkowski Safran & Cole, P.C.

(57) ABSTRACT

A crosslinked resin composition includes a resin composition including not less than 0.01 parts by mass and not more than 20 parts by mass of a vinyl monomer relative to 100 parts by mass of a thermoplastic polyurethane, the vinyl monomer having a molecular structure including at least one functional group of acid anhydride, silane, amine and epoxy. The resin composition is crosslinked by an electron beam irradiation.

14 Claims, 2 Drawing Sheets

CROSSLINKED RESIN COMPOSITION, AND WIRE, CABLE AND MOLDED WIRE COATED WITH THE SAME

The present application is based on Japanese patent application Nos. 2011-133221 and 2012-021759 filed on Jun. 15, 2011 and Feb. 3, 2012, respectively, the entire contents of which are incorporated herein by reference.

BACKGROUND OF THE INVENTION

1. Field of the Invention

This invention relates to a crosslinked resin composition including a thermoplastic polyurethane, and a wire, a cable and a molded wire that are coated with the crosslinked resin composition.

2. Description of the Related Art

Conventionally, thermoplastic polyurethane (hereinafter, referred to as TPU) is widely used as a sheath material of a cable used in vehicles, robots and electronic devices, etc., due to its excellent mechanical characteristics and flexibility at low temperature. When various characteristics such as heat resistance, oil resistance and abrasion resistance, etc., are required depending on use environment, etc., of wires or cables and especially when heat resistance is required, a method of ensuring heat resistance by crosslinking TPU is used.

Meanwhile, when the wires or cables are connected to device components such as sensor, electrode terminals or other electronic circuits, peripheries of a connecting portion therebetween and the vicinity thereof are covered by a resin molded body for waterproofing the connecting portion.

When a cable is used for, e.g., an anti-lock braking system (hereinafter, referred to as ABS) for vehicle, heat resistance and waterproof properties are required. In an ABS which, as a vehicle safety control system, is composed of a wheel speed sensor, an electronic control unit and a hydraulic unit, the wheel speed sensor is provided on a wheel. Therefore, a cable connecting a sensor to a system is used under extreme conditions and use of a cable having heat resistance is an essential condition. In general, a connecting portion between a sensor and a cable is covered by a resin molded body for the purpose of waterproof and polyamide having high heat, impact and oil resistances is often used for the resin molded body.

In order to prevent contact failure due to the influence of use environment, it is required to improve especially waterproof of the cable connecting portion, i.e., air tightness between an outermost insulation of wire or a sheath of cable and a resin molded body.

For example, WO2005/013291 has proposed a method in which a mixed resin composition of thermoplastic polyurethane and thermoplastic polyester, as a sheath material of ABS sensor cable, is crosslinked to improve thermal adhesiveness with a resin molded body composition.

SUMMARY OF THE INVENTION

However, as a material of the outermost insulation or a sheath material, it is preferable to use TPU alone than using a mixed resin from the viewpoint of mechanical strength or flexibility of wire or cable. And yet, the TPU, when used alone, has a problem that it is difficult to improve air tightness (as an index for evaluating the waterproof performance) to a resin molded body which covers an end of wire or cable.

In addition, global awareness about environmental issues is growing in recent years and it is required to form an insulation of the wire or cable from a material not containing halogen since harmful halogen gas is generated therefrom when burnt.

Accordingly, it is an object of the invention to provide a crosslinked resin composition having high heat resistance, and a wire, a cable and a molded wire that air tightness to a resin molded body at the connection portion is improved by applying the crosslinked resin composition to the outermost insulation or the sheath.

(1) According to one embodiment of the invention, a crosslinked resin composition comprises:

a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy, wherein the resin composition is crosslinked by an electron beam irradiation.

In the above embodiment (1) of the invention, the following modifications and changes can be made.

(i) The resin composition further comprises a triazine-based or phosphorus-based flame retardant.

(ii) The flame retardant is contained at a rate of not less than 20 parts by mass and not more than 200 parts by mass relative to 100 parts by mass of the thermoplastic polyurethane in the resin composition.

(iii) The triazine-based flame retardant comprises melamine cyanurate.

(2) According to another embodiment of the invention, a wire comprises:

an insulation on an outer periphery of a conductor;

wherein the insulation at an outermost layer of the wire comprises a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy, and wherein the resin composition is crosslinked by an electron beam irradiation.

In the above embodiment (2) of the invention, the following modifications and changes can be made.

(iv) The resin composition further comprises a triazine-based or phosphorus-based flame retardant.

(v) The flame retardant is contained at a rate of not less than 20 parts by mass and not more than 200 parts by mass relative to 100 parts by mass of the thermoplastic polyurethane in the resin composition.

(3) According to another embodiment of the invention, a cable comprises:

a sheath on an outer periphery of a wire core formed by twisting a plurality of wires each comprising a conductor and an insulation thereon, wherein the sheath at an outermost layer of the cable comprises a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy, and wherein the resin composition is crosslinked by an electron beam irradiation.

In the above embodiment (3) of the invention, the following modifications and changes can be made.

(vi) The resin composition further comprises a triazine-based or phosphorus-based flame retardant.

(vii) The flame retardant is contained at a rate of not less than 20 parts by mass and not more than 200 parts by mass relative to 100 parts by mass of the thermoplastic polyurethane in the resin composition.

(4) According to another embodiment of the invention, a molded wire comprises:

a wire comprising an insulation on an outer periphery of a conductor; and a resin molded body at a terminal of the wire, wherein the insulation at an outermost layer of the wire comprises a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy, wherein the resin composition is crosslinked by an electron beam irradiation.

In the above embodiment (4) of the invention, the following modifications and changes can be made.

(viii) The vinyl monomer has a molecular structure comprising a functional group of an acid anhydride or silane, and the resin molded body comprises a polybutylene terephthalate resin.

(ix) The resin composition further comprises a triazine-based or phosphorus-based flame retardant.

(x) The flame retardant is contained at a rate of not less than 20 parts by mass and not more than 200 parts by mass relative to 100 parts by mass of the thermoplastic polyurethane in the resin composition.

Effects of the Invention

According to one embodiment of the invention, a crosslinked resin composition can be provided that has high heat resistance, and a wire, a cable and a molded wire can be provided that air tightness to a resin molded body at the connection portion is improved by applying the crosslinked resin composition to the outermost insulation or the sheath

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

A preferred embodiment of the invention will be described in detail below in conjunction with the appended drawings. FIGS. 1 to 4 show structures of wire and cable using the crosslinked resin composition of the invention.

Figure 1:
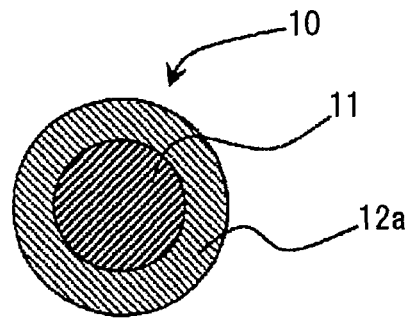
FIG. 1 is a cross sectional view showing a wire using a crosslinked resin composition of the present invention as a single-layered insulation.

The resin composition of the invention is extruded as a single outermost insulation 12a to coat an outer periphery of a conductor 11 formed by twisting multiple strands and is then crosslinked by electron beam, thereby forming a wire 10 of FIG. 1.

Figure 2:
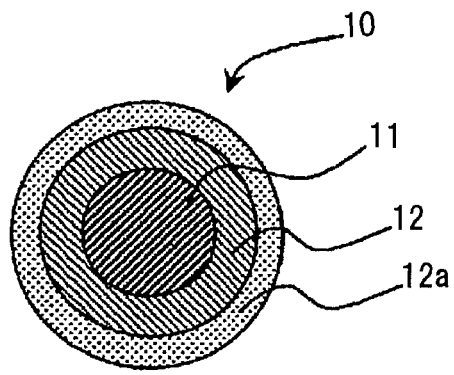
FIG. 2 is a cross sectional view showing a wire using the crosslinked resin composition of the invention as a multi-layered insulation.

After an outer periphery of a conductor 11 formed by twisting multiple strands is coated with the resin composition of the invention or a polyolefin resin composition as an insulation 12, the resin composition of the invention is further extruded as an outermost insulation 12a to coat the outer periphery thereof and is then crosslinked by electron beam, thereby forming a wire 10 of FIG. 2.

Figure 3:
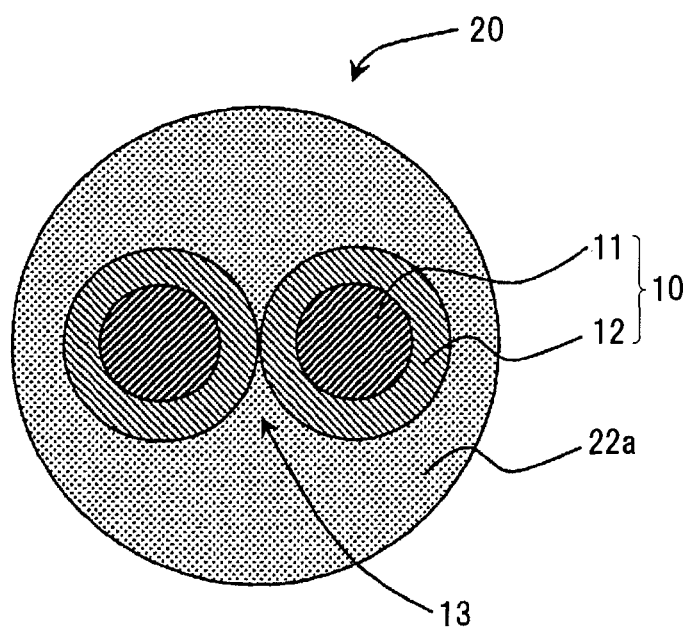
FIG. 3 is a cross sectional view showing a cable using the crosslinked resin composition of the invention as a single-layered sheath.

The resin composition of the invention is extruded as a sheath 22a to coat an outer periphery of a multi-core twisted wire 13 formed by twisting plural wires 10 having a single-layered insulation shown in FIG. 1 and is then crosslinked by electron beam, thereby forming a cable 20 of FIG. 3. In this case, the insulation of the wire 10 may be formed of either the resin composition of the invention or a polyolefin resin.

Figure 4:
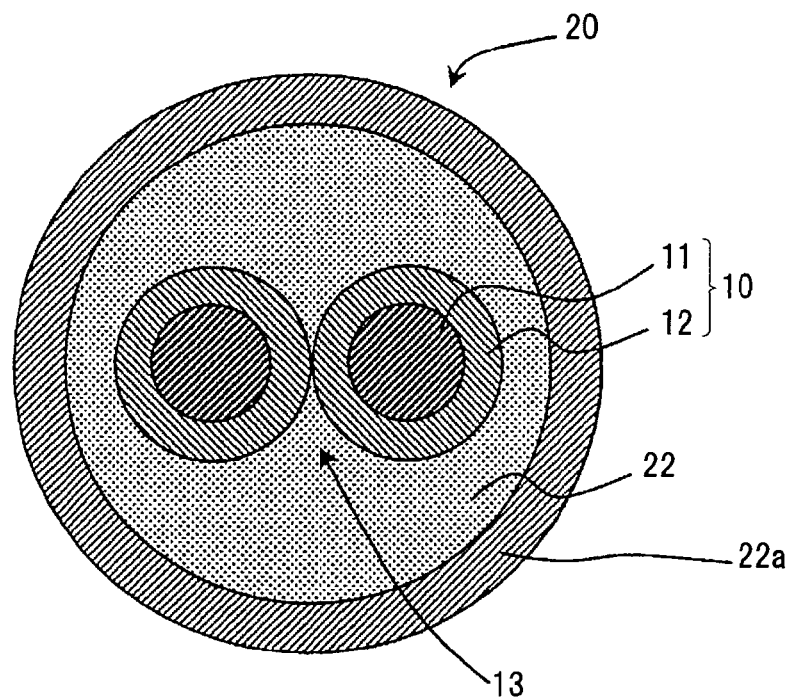
FIG. 4 is a cross sectional view showing a cable using the crosslinked resin composition of the invention as a multi-layered sheath.

The resin composition of the invention or a polyolefin resin composition is extruded as an inner insulation 22 to coat an outer periphery of a multi-core twisted wire 13 formed by twisting plural wires 10 having a single-layered insulation shown in FIG. 1, the resin composition of the invention is further extruded as a sheath 22a and is then crosslinked by electron beam, thereby forming a cable 20 of FIG. 4. In this case, the insulation of the wire 10 may be formed of either the resin composition of the invention or a polyolefin resin.

When the conductor 11 is connected to a device component such as sensor or an electrode terminal, peripheries of a connecting portion of the wire 10 or the cable 20 and the vicinity thereof may be coated with a resin by injection molding so as to cover the device component or the electrode terminal.

The crosslinked resin composition of the invention is flexible and excellent in heat resistance. Especially, the wire 10 and the cable 20 using the crosslinked resin composition respectively for the outermost insulation 12a and the sheath 22a exhibit high air tightness with respect to a resin molded body when a connecting portion at an end thereof is covered by the resin molded body.

The crosslinked resin composition of the invention is will be described below.

The crosslinked resin composition of the invention is formed of a resin composition in which not less than 0.01 parts by mass and not more than 20 parts by mass of vinyl monomer containing at least one of acid anhydride, silane, amine and epoxy is contained per 100 parts by mass of TPU and which is crosslinked by electron beam irradiation.

The TPU used in the invention includes polyester-based urethane (adipate base, caprolactone base, polycarbonate base) and polyether-based urethane, and it is preferable to use polyether-based urethane from the viewpoint of heat and humidity resistance.

In the vinyl monomer-containing TPU used for the resin composition, if the added amount of vinyl monomer is less than 0.01 parts by mass, it is not possible to ensure good air tightness when covered by a resin molded body. Meanwhile, when the vinyl monomer is contained more than 20 parts by mass, the vinyl monomer is bled out on a surface of the outermost insulation of the wire or the sheath of the cable, which deteriorates the outer appearance.

More preferably, the vinyl monomer is contained in an amount of not less than 1 part by mass and not more than 10 parts by mass per 100 parts by mass of TPU. The more the vinyl monomer is added up to the upper limit of 20 parts by mass, the better the air tightness with respect to the resin molded body even though the minimum air tightness is achieved by 0.01 parts by mass of the vinyl monomer. On the other hand, excess addition of the vinyl monomer may cause necessity of viscosity control to some extent at the time of molding since many of the below-described vinyl monomers are generally in the liquid form and a large amount of addition thereof to a resin composition containing TPU reduces viscosity of the resin composition per se, hence, the added amount of vinyl monomer should be not less than 1 parts by mass and not more than 10 parts by mass from the production standpoint.

The vinyl monomer containing any of acid anhydride, silane, amine and epoxy functional groups which is added to the resin composition has a very high reactivity and is grafted onto TPU by electron beam irradiation by which functional groups of the TPU and the vinyl monomer are strongly bonded, resulting in a crosslinked resin composition excellent in heat resistance.

The acid anhydride-containing vinyl monomers include maleic anhydride and phthalic anhydride, etc.

The silane-containing vinyl monomers include silane compounds such as vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane and 3-acryloxypropyltrimethoxysilane, etc.

The amine-containing vinyl monomers include amine compounds such as 2,4-diamino-6-vinyl-s-triazine, 2,4-diamino-6-methacryloyloxyethyl-s-triazine, 2,4-diamino-6-vinyl-s-triazine isocyanuric acid adduct and 2-methylimidazole, etc.

The epoxy-containing vinyl monomers include vinyl cyclohexene monoxide, 1,2-epoxy-4-vinylcyclohexane, limonene monoxide, 1,3-butadiene monoepoxide, 1,2-epoxy-9-decene, glycidyl methacrylate and vinyl glycidyl ether, etc.

In addition, a flame retardant may be added to the resin composition. The added amount thereof is preferably not less than 20 parts by mass and not more than 200 parts by mass and, more preferably, not less than 30 parts by mass and not more than 200 parts by mass, relative to 100 parts by mass of TPU.

As a flame retardant, it is preferable to use a triazine-based flame retardant or a phosphorus-based flame retardant which can be used alone or in combination thereof. It is not possible to impart sufficient flame retardancy when less than 20 parts by mass while bloom occurs on the surface of the insulation or sheath when more than 200 parts by mass, which deteriorates the outer appearance.

The triazine-based flame retardants include melamine, melamine cyanurate and melamine phosphate, etc. Especially, melamine cyanurate is preferable since melamine therein is sublimed during molding and there is thus an effect of preventing contamination of a mold. The phosphorus-based flame retardants include red phosphorus, phosphoric ester, aromatic condensed phosphoric ester and phosphazene compounds, etc.

As a flame retardant, there are also halogen-based flame retardants containing chlorine or bromine or metal hydrates such as magnesium hydroxide and aluminum hydroxide. However, it is not possible to use halogen-based flame retardants since harmful gas is generated when burnt. On the other hand, the metal hydrates begin to decompose at about 160 to 300° C. and the resin composition is foamed when exposed to a high temperature environment, which impairs the outer appearance. Furthermore, in case that the resin composition is used for an outermost insulation or sheath of a wire or cable and an end of the wire or cable is coated by injection molding, application of the metal hydrate as a flame retardant to be contained in the resin composition is difficult since the insulation (including the outermost insulation and the sheath) is foamed and air tightness with respect to the resin molded body decreases.

To the resin composition, it is possible to add flame-retardant aid, cross-linking agent, crosslinking aid, ultraviolet absorber, light stabilizer, softener, lubricant, colorant, reinforcing agent, surface active agent, antioxidant, inorganic filler, coupling agent, plasticizer, metal chelator, foaming agent, compatibilizing agent, processing aid and stabilizer, etc., where appropriate.

The wire and cable in which the resin composition of the invention is used for the insulation will be described below.

The resin composition is extruded on a conductor or a wire core, is then crosslinked by electron beam and can be thus used as an insulation of the wire or cable. It is possible to preferably use the crosslinked resin composition of the invention especially for the outermost insulation of wire or for the sheath of the cable.

The conductor is not limited to a copper wire and it is possible to use a filament of other metals, alloys, ceramics or organic substances, etc., as long as sufficient conductivity can be ensured.

The dose of electron beam irradiation for crosslinking is not specifically limited but is preferably 100 to 200 kGy and should be the dose required for promoting sufficient crosslinking. The crosslinked resin composition excellent in heat resistance is obtained by crosslinking the resin composition of the invention using electron beam. A chemical crosslinking using organic peroxide, etc., is a crosslinking method other than the electron beam irradiation crosslinking but it is not suitable as a method for crosslinking the resin composition of the invention since the extruding temperature for TPU which is a base resin of the resin composition of the invention is more than 200° C. and scorching will occur at the time of extrusion.

When the wire or cable is connected to an electrode terminal, etc., it is necessary to cover the periphery of the connecting portion therebetween by a resin molded body, and the wire or cable using the crosslinked resin composition for the outermost insulation or the sheath exhibits good air tightness with respect to the resin molded body covering the periphery of the connecting portion, in addition to the effects described above.

The following is the reason why the insulation or sheath formed of the crosslinked resin composition of the invention is excellent in air tightness with respect to the resin molded body covering the outer periphery thereof.

The base polymer of the resin composition of the invention is TPU composed of a hard segment which is a urethane bond of diisocyanate with short-chain glycol and a soft segment which is long-chain glycol. When a vinyl monomer having a molecular structure containing any of acid anhydride, silane, amine and epoxy functional groups is added to TPU and is crosslinked, a vinyl group in the vinyl monomer is radically reacted with and grafted onto the long-chain glycol of TPU and is firmly bonded thereto, and it is thus possible to obtain a crosslinked resin composition excellent in heat resistance. In addition, it is considered that, when the outer periphery of the wire or cable having the outermost insulation or sheath formed of the crosslinked resin composition is covered by the resin molded body, a functional group of the sheath also reacts with a polymer constituting the resin molded body and it is thus possible to improve air tightness with respect to the resin molded body.

Adhesion with polyamide which is generally used as a resin molded body is especially good. It is considered that this is because an amino group or a carboxylic acid contained in a polymer constituting the resin molded body reacts with a functional group of the crosslinked resin composition constituting the outermost insulation or the sheath.

In addition, when a functional group of a vinyl monomer to be added to the resin composition is appropriately selected, air tightness with respect to a resin molded body formed of polybutylene terephthalate (hereinafter, referred to as PBT) is also improved. As shown in below-described Examples, it was found that, in case of the resin molded body formed of PBT, it is more effective especially when the vinyl monomer contained in the crosslinked resin composition to be the outermost insulation or the sheath has an acid anhydride group or a silane group.

When the crosslinked resin composition is used for the wire or cable, the insulation may have either a single-layer or multi-layer structure as shown in FIGS. 1 to 4. The insulation may have a multi-layer structure such that the crosslinked resin composition of the invention is used for the outermost insulation or the sheath which is located outermost, and either the crosslinked resin composition of the invention or a polyolefin resin is used for the insulation other than the outermost layer (i.e., an insulation located inward).

The polyolefin resins include low-density polyethylene, ethylene-vinyl acetate copolymer (EVA), ethylene-ethyl acrylate copolymer, ethylene-methyl acrylate copolymer, ethylene-glycidyl methacrylate copolymer, maleic anhydride polyolefin and ethylene-α-olefin copolymer, etc., which may be used alone or in combination of two or more thereof. EVA is especially preferred since adhesion with the outermost insulation or the sheath formed of the crosslinked resin composition as described above is excellent and dimensional stability can be ensured at the time of processing an end of a cable.

To the insulation formed of a polyolefin resin other than the outermost insulation or the sheath, it is possible to add flame retardant, flame-retardant aid, cross-linking agent, crosslinking aid, ultraviolet absorber, light stabilizer, softener, lubricant, colorant, reinforcing agent, surface active agent, antioxidant, inorganic filler, coupling agent, plasticizer, metal chelator, foaming agent, compatibilizing agent, processing aid and stabilizer, etc., where appropriate.

While electron beam is used for crosslinking the resin composition of the invention as described above, a crosslinking method used at the time of coating the polyolefin resin as an insulation other than the outermost layer (i.e., an insulation located inward) of the wire or cable is not specifically defined.

The crosslinking treatment includes chemical crosslinking using organic peroxide or sulphur compound, radiation crosslinking using electron beam or radiation and crosslinking using other chemical reactions, etc., and all crosslinking methods are applicable.

It should be noted that application of the resin composition of the invention is not limited to a wire and a cable and it is applicable to extrudates such as pipe, sheet, tube, rod or string, blow molded products such as film and any other molded products such as bottle, various containers and fibers, etc., which are crosslinked by electron beam irradiation.

EXAMPLES

Next, Examples of the invention will be explained in conjunction with Comparative Examples.

Mirason 3530 (manufactured by Du Pont-Mitsui Polychemicals Co., Ltd) which is low-density polyethylene (d: 920 kb/m$^2$) was extruded as an insulation to coat forty-eight 0.08 mm-conductors using a 40 mm-extruder (L/D=24) so as to have an outer diameter of 1.4 mm. The obtained insulated wire was exposed to an electron beam at a dose of 100 kGy and two of the insulated wires were twisted together, thereby preparing a multi-core twisted wire. In Examples 1 and 2, the compositions shown in columns of Examples 1 and 2 of Table 1 were extruded as a sheath to coat the multi-core twisted wire so as to have an outer diameter of 4.0 mm. The obtained cable was exposed to an electron beam at a dose of 200 kGy to crosslink the sheath, thereby making a cable shown in FIG. 3.

Meanwhile, in Examples other than Examples 1 and 2 and in Comparative Examples, the multi-core twisted wire was coated with EVA (VA=33%, EV170 manufactured by Du Pont-Mitsui Polychemicals Co., Ltd.) as an inner insulation so as to have an outer diameter of 3.4 mm and was further extrusion-coated with each composition shown in Table 1 as a sheath so as to have an outer diameter of 4.0 mm. The obtained cable was exposed to an electron beam at a dose of 200 kGy to crosslink the sheath, thereby making a cable having a coating composed of two layers, the inner insulation and the sheath, as shown in FIG. 4.

In a heat resistance test conforming to AVX of JASO D608, the cable was wound around own diameter (φ4 mm) 6 times, was heated in a constant-temperature oven at 200° C. for 30 minutes and was cooled to room temperature. The cable appearance without melting or cracks was judged as "passed (indicated by ◯)" and the appearance with melting or cracks was judged as "failed (indicated by X)".

The degree of cross-linking is described as a gel fraction, conforming to AVX of JASO D608.

For evaluating bloom, cable appearance was observed after leaving the cable in an environment at 23° C. and 50% RH for one week. The cable without bloom was judged as "passed (◯)" and the cable with significant blooms enough to degrade the appearance was judged as "failed (X)".

Meanwhile, Examples 21 to 38 and Comparative Examples 11 to 13 are examples in which a flame retardant is added to the sheath. The flame retardancy evaluation in this case conforms to AVX of JASO D608, where flame is applied to the horizontally held cable for 10 seconds, and time from the removal of flame until extinction is evaluated. Extinction within 60 seconds after removing the flame is judged as satisfactory flame retardancy and extinction within 30 seconds is judged as excellent.

For peel strength evaluation, glass-fiber-reinforced ABS (acrylonitrile-butadiene-styrene copolymer) (GF(glass fiber content)=30%, Denka GR-2030G manufactured by Denki Kagaku Kogyo Kabushiki Kaisha) was injection-molded into a strip shape (length: 100 mm, width: 10 mm, thickness: 1 mm), each sheath material shown in Tables 1 to 3 was bonded to the obtained strip sample by heat-press molding and electron beam was irradiated thereon. A T-peel test was conducted on the obtained samples at a tension rate of 50 mm/min. Peel strength of not less than 40 N/cm was judged as "passed (◯)" and less than 40 N/cm was judged as "failed (X)".

Figure 5:
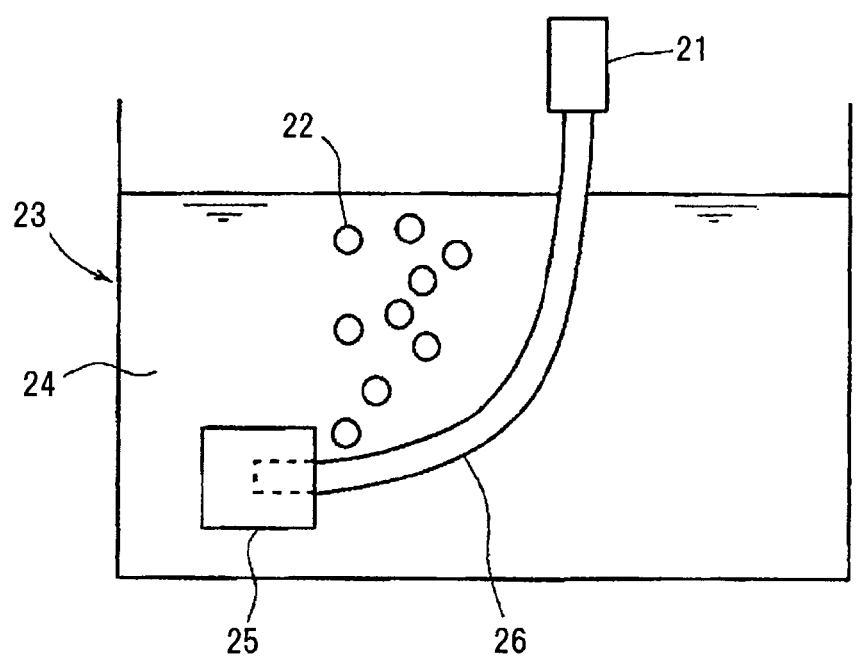
FIG. 5 is a schematic diagram showing a test equipment for testing air tightness of a cable covered by a resin molded body in the invention and Comparative Examples.

For air tightness evaluation, polyamide (GF=30%, Reny 1002F manufactured by Mitsubishi Engineering-Plastics Corporation) was molded as a resin molded body 25 (diameter: 15 mm, length: 20 mm, length of cable inserted therein: 15 mm) on an end of a cable 26 by injection molding to seal off the cable end as shown in FIG. 5, thereby preparing a sample. A thermal shock test was conducted on the obtained sample for 1000 cycles of −40° C. for 30 minutes and 120° C. for 30 minutes.

After that, compressed air was blown to the end of the cable 26 from an air supplier 21 at 0.2 MPa for 30 seconds in a state that the sample was placed so that the polyamide resin molded body 25 was dipped in water 24 in a tank 23 as shown in FIG. 5. The sample in which air bubbles 22 did not emerge from between the polyamide resin molded body 25 and the cable 26 during air blowing was judged as "passed".

50 samples were tested and the result is shown as the number of samples passed/the number of samples tested. The cable of which number of samples passed is 50 was judged as "passed". Although the cable with the result of 50/50 already passed the evaluation, a pulling test of the cable from the polyamide resin molded body was further conducted on the cables which have been judged as "passed" in order to confirm air tightness between the cable and the polyamide resin molded body. The sample in which the cable was not pulled out and the polyamide resin molded body was broken was judged as "passed (○)" and the sample in which a boundary face between the cable and the polyamide resin molded body was broken was judged as "acceptable (Δ)". The cable of which number of samples passed is less than 50 was judged as "failed (X)".

Each item was evaluated as described above, and the cable which passed all tests of heat resistance, presence of bloom, peel strength and air tightness with respect to the polyamide resin molded body was judged as "passed (○)" as the comprehensive evaluation. The cable which failed any one of heat resistance, presence of bloom, peel strength and air tightness with respect to the polyamide resin molded body was judged as "failed (X)" as the comprehensive evaluation.

Example 1

A compound of 100 parts by mass of TPU (ET890 manufactured by BASF Japan Ltd.) and 1 part by mass of 3-methacryloxypropyltrimethoxysilane as a silane-containing vinyl monomer (KBM503 manufactured by Shin-Etsu Chemical Co., Ltd.) was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. Then, a cable as shown in FIG. 3 was made by extrusion-coating of the compound using a 40 mm-extruder (L/D=24) so that the sheath has an outer diameter of 4.0 mm. The obtained cable was crosslinked by irradiating an electron beam at a dose of 200 kGy.

The results are shown in Table 1. The gel fraction of the sheath was 77% and sufficient crosslinking was confirmed. In addition, it is understood that the sheath has sufficient heat resistance since bloom was not present on the outer appearance and melting or cracks were not observed in the heat resistance test. Furthermore, the peel strength was 45 N/cm, 50 out of 50 samples passed the test of air tightness with respect to the polyamide resin molded body and the resin molded body was broken in the pulling test, and it is thus understood that the sheath is strongly adhered to the polyamide resin molded body. All criteria are evaluated as "passed", hence, the comprehensive evaluation is also "passed (○)".

Example 2

A compound of 100 parts by mass of TPU (ET890 manufactured by BASF Japan Ltd.) and 1 part by mass of glycidyl methacrylate as an epoxy-containing vinyl monomer (Blemmer G manufactured by Nippon Oil & Fats Co., Ltd.) was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. Then, a cable as shown in FIG. 3 was made by extrusion-coating of the compound using a 40 mm-extruder (L/D=24) so that the sheath has an outer diameter of 4.0 mm. The obtained cable was crosslinked by irradiating an electron beam at a dose of 200 kGy.

As a result, the gel fraction of the sheath was 77% and sufficient crosslinking was confirmed as shown in Table 1. In addition, it is understood that the sheath has sufficient heat resistance since bloom was not present on the outer appearance and melting or cracks were not observed in the heat resistance test. Furthermore, the peel strength was 44 N/cm, 50 out of 50 samples passed the test of air tightness with respect to the polyamide resin molded body and the resin molded body was broken in the pulling test, and it is thus understood that the sheath is strongly adhered to the polyamide resin molded body. All criteria are evaluated as "passed", hence, the comprehensive evaluation is also "passed (○)".

Example 3

A compound of 100 parts by mass of TPU (ET890 manufactured by BASF Japan Ltd.) and 1 part by mass of 2,4-diamino-6-methacryloyloxyethyl-s-triazine as an amine-containing vinyl monomer (MAVT manufactured by Shikoku Chemicals Corporation) was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. EVA (EV170 manufactured by Du Pont-Mitsui Polychemicals Co., Ltd.) was used as an inner insulation, and a cable as shown in FIG. 4 was made by extrusion-coating using a 40 mm-extruder (L/D=24) so that the inner insulation has an outer diameter of 3.4 mm and the sheath has an outer diameter of 4.0 mm. The obtained cable was crosslinked by irradiating an electron beam at a dose of 200 kGy.

The results are shown in Table 1. It is understood that the sheath has sufficient heat resistance since bloom was not present on the outer appearance and melting or cracks were not observed in the heat resistance test. It is considered that adhesion is slightly inferior to Examples 1 and 2 since the peel strength was 41 N/cm and the boundary face between the sheath and the resin molded body was broken at the time of the pulling test of the sheath and the resin molded body, however, 50 out of 50 samples passed the air tightness test and sufficient air tightness was confirmed. All criteria are evaluated as "passed", hence, the comprehensive evaluation is also "passed (○)".

Example 4

A compound of 100 parts by mass of TPU (ET890 manufactured by BASF Japan Ltd.) and 1 part by mass of maleic anhydride manufactured by Nippon Oil & Fats Co., Ltd. as an acid anhydride-containing vinyl monomer was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. EVA (EV170 manufactured by Du Pont-Mitsui Polychemicals Co., Ltd.) was used as an inner insulation, and a cable as shown in FIG. 4 was made by extrusion-coating using a 40 mm-extruder (L/D=24) so that the inner insulation has an outer diameter of 3.4 mm and the sheath has an outer diameter of 4.0 mm. The obtained cable was crosslinked by irradiating an electron beam at a dose of 200 kGy.

The results are shown in Table 1. It is understood that the sheath has sufficient heat resistance since bloom was not present on the outer appearance and melting or cracks were not observed in the heat resistance test. Furthermore, the peel strength was 43 N/cm, 50 out of 50 samples passed the test of air tightness with respect to the polyamide resin molded body and the resin molded body was broken in the pulling test, and it is thus understood that the sheath is strongly adhered to the polyamide resin molded body. All criteria are evaluated as "passed", hence, the comprehensive evaluation is also "passed (○)".

Examples 5 to 8

A compound of TPU (ET890 manufactured by BASF Japan Ltd.) and 2,4-diamino-6-methacryloyloxyethyl-s-triazine as an amine-containing vinyl monomer (MAVT manufactured by Shikoku Chemicals Corporation) mixed at a compounding ratio shown in Table 1 was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. EVA (EV170 manufactured by Du Pont-Mitsui Polychemicals Co., Ltd.) was used as an inner insulation, and a cable as shown in FIG. 4 was made by extrusion-coating using a 40 mm-extruder (L/D=24) so that the inner insulation has an outer diameter of 3.4 mm and the sheath has an outer diameter of 4.0 mm. The obtained cable was crosslinked by irradiating an electron beam at a dose of 200 kGy.

As a result, all evaluations are satisfactory in Examples 5 to 8 in which 2,4-diamino-6-methacryloyloxyethyl-s-triazine is added in a range of 0.01 to 20 parts by mass as shown in Table 1, hence, each comprehensive evaluation is also "passed". Especially in Examples 6 to 8 in which the added amount of 2,4-diamino-6-methacryloyloxyethyl-s-triazine is 3 to 20 parts by mass, it was confirmed that the sheath is strongly adhered to the polyamide resin molded body since the polyamide resin molded body was broken in the pulling test of the sheath and the polyamide resin molded body.

Examples 9 to 12

A compound of TPU (ET890 manufactured by BASF Japan Ltd.) and 3-methacryloxypropyltrimethoxysilane as a silane-containing vinyl monomer (KBM503 manufactured by Shin-Etsu Chemical Co., Ltd.) mixed at a compounding ratio shown in Table 1 was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. EVA (EV170 manufactured by Du Pont-Mitsui Polychemicals Co., Ltd.) was used as an inner insulation, and a cable as shown in FIG. 4 was made by extrusion-coating using a 40 mm-extruder (L/D=24) so that the inner insulation has an outer diameter of 3.4 mm and the sheath has an outer diameter of 4.0 mm. The obtained cable was crosslinked by irradiating an electron beam at a dose of 200 kGy.

As a result, all evaluations are satisfactory in Examples 9 to 12 in which 3-methacryloxypropyltrimethoxysilane is added in a range of 0.01 to 20 parts by mass as shown in Table 1, hence, each comprehensive evaluation is also "passed". Especially in Examples 10 to 12 in which the added amount of 3-methacryloxypropyltrimethoxysilane is 3 to 20 parts by mass, it was confirmed that the sheath is strongly adhered to the polyamide resin molded body since the polyamide resin molded body was broken in the pulling test of the sheath and the polyamide resin molded body.

Examples 13 to 16

A compound of TPU (ET890 manufactured by BASF Japan Ltd.) and maleic anhydride manufactured by Nippon Oil & Fats Co., Ltd. as an acid anhydride-containing vinyl monomer mixed at a compounding ratio shown in Table 1 was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. EVA (EV170 manufactured by Du Pont-Mitsui Polychemicals Co., Ltd.) was used as an inner insulation, and a cable as shown in FIG. 4 was made by extrusion-coating using a 40 mm-extruder (L/D=24) so that the inner insulation has an outer diameter of 3.4 mm and the sheath has an outer diameter of 4.0 mm. The obtained cable was crosslinked by irradiating an electron beam at a dose of 200 kGy.

As a result, all evaluations are satisfactory in Examples 13 to 16 in which maleic anhydride is added in a range of 0.01 to 20 parts by mass as shown in Table 1, hence, each comprehensive evaluation is also "passed". Especially in Examples 14 to 16 in which the added amount of maleic anhydride is 3 to 20 parts by mass, it was confirmed that the sheath is strongly adhered to the polyamide resin molded body since the polyamide resin resin molded body was broken in the pulling test of the sheath and the polyamide resin molded body.

Examples 17 to 20

A compound of TPU (ET890 manufactured by BASF Japan Ltd.) and glycidyl methacrylate as an epoxy-containing vinyl monomer (Blemmer G manufactured by Nippon Oil & Fats Co., Ltd.) mixed at a compounding ratio shown in Table 1 was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. EVA (EV170 manufactured by Du Pont-Mitsui Polychemicals Co., Ltd.) was used as an inner insulation, and a cable as shown in FIG. 4 was made by extrusion-coating using a 40 mm-extruder (L/D=24) so that the inner insulation has an outer diameter of 3.4 mm and the sheath has an outer diameter of 4.0 mm. The obtained cable was crosslinked by irradiating an electron beam at a dose of 200 kGy.

As a result, all evaluations are satisfactory in Examples 17 to 20 in which glycidyl methacrylate is added in a range of 0.01 to 20 parts by mass as shown in Table 1, hence, each comprehensive evaluation is also "passed". Especially in Examples 18 to 20 in which the added amount of glycidyl methacrylate is 3 to 20 parts by mass, it was confirmed that the sheath is strongly adhered to the polyamide resin molded body since the polyamide resin molded body was broken in the pulling test of the sheath and the polyamide resin molded body.

A polyamide resin was used as a resin molded body covering an end of the cable in Examples 1 to 20 and good results were obtained in each Example. Then, when polybutylene terephthalate ((GF=30%), NOVADURAN 5010G30X4 manufactured by Mitsubishi Engineering-Plastics Corporation) was used as a resin molded body instead of using polyimide, it was confirmed that air tightness is also exhibited even though it is inferior to the case of using polyamide resin molded body such that the samples passed the air tightness test are 40 out of 50. It was found that especially the cables in Examples 1 and 9 to 12 with addition of 3-methacryloxypropyltrimethoxysilane containing silane and those in Examples 4 and 13 to 16 with addition of maleic anhydride containing acid anhydride exhibit high air tightness since 50 out of 50 samples passed the test of air tightness with respect to a polybutylene terephthalate (PBT) resin molded body.

TABLE 1

| | Items | | Examples (Unit of blending amount: parts by mass) | | | | | | | | | |
|---|---|---|---|---|---|---|---|---|---|---|---|---|
| | | | 1 | 2 | 3 | 4 | 5 | 6 | 7 | 8 | 9 | 10 |
| Sheath | TPU [1] | | 100 | 100 | 100 | 100 | 100 | 100 | 100 | 100 | 100 | 100 |
| | 2,4-diamino-6-methacryl-oyloxyethyl-s-triazine [2] | | | | 1 | | 0.01 | 3 | 10 | 20 | | |
| | 3-methacryloxypropyltri-methoxysilane [3] | | 1 | | | | | | | | 0.01 | 3 |
| | Maleic anhydride [4] | | | | | 1 | | | | | | |
| | Glycidyl methacrylate [5] | | | 1 | | | | | | | | |
| Inner insulation | EVA [6] | | | 100 | 100 | 100 | 100 | 100 | 100 | 100 | 100 | 100 |
| Irradiance level (kGy) | | | 200 | 200 | 200 | 200 | 200 | 200 | 200 | 200 | 200 | 200 |
| Evaluation | Heat resistance (presence of melting, cracks) | | ○ | ○ | ○ | ○ | ○ | ○ | ○ | ○ | ○ | ○ |
| | Gel fraction (%) | | 77 | 77 | 77 | 77 | 78 | 76 | 73 | 70 | 79 | 78 |
| | Bloom | | ○ | ○ | ○ | ○ | ○ | ○ | ○ | ○ | ○ | ○ |
| | Peel strength (N/cm) | ABS [7] | 45 | 44 | 41 | 43 | 40 | 43 | 45 | 48 | 41 | 46 |
| | Judgment | | ○ | ○ | ○ | ○ | ○ | ○ | ○ | ○ | ○ | ○ |
| | Air tightness (passed/tested) | Polyamide [8] | 50/50 | 50/50 | 50/50 | 50/50 | 50/50 | 50/50 | 50/50 | 50/50 | 50/50 | 50/50 |
| | Judgment | | ○ | ○ | Δ | ○ | Δ | ○ | ○ | ○ | Δ | ○ |
| | Comprehensive evaluation | | ○ | ○ | ○ | ○ | ○ | ○ | ○ | ○ | ○ | ○ |
| | Air tightness (passed/tested) | Polybutylene terephthalate [9] | 50/50 | 49/50 | 44/50 | 50/50 | 45/50 | 47/50 | 49/50 | 50/50 | 50/50 | 50/50 |

| | Items | | Examples (Unit of blending amount: parts by mass) | | | | | | | | | |
|---|---|---|---|---|---|---|---|---|---|---|---|---|
| | | | 11 | 12 | 13 | 14 | 15 | 16 | 17 | 18 | 19 | 20 |
| Sheath | TPU [1] | | 100 | 100 | 100 | 100 | 100 | 100 | 100 | 100 | 100 | 100 |
| | 2,4-diamino-6-methacryl-oyloxyethyl-s-triazine [2] | | | | | | | | | | | |
| | 3-methacryloxypropyltri-methoxysilane [3] | | 10 | 20 | | | | | | | | |
| | Maleic anhydride [4] | | | | 0.01 | 3 | 10 | 20 | | | | |
| | Glycidyl methacrylate [5] | | | | | | | | 0.01 | 3 | 10 | 20 |
| Inner insulation | EVA [6] | | 100 | 100 | 100 | 100 | 100 | 100 | 100 | 100 | 100 | 100 |
| Irradiance level (kGy) | | | 200 | 200 | 200 | 200 | 200 | 200 | 200 | 200 | 200 | 200 |
| Evaluation | Heat resistance (presence of melting, cracks) | | ○ | ○ | ○ | ○ | ○ | ○ | ○ | ○ | ○ | ○ |
| | Gel fraction (%) | | 76 | 71 | 78 | 77 | 75 | 72 | 79 | 78 | 74 | 70 |
| | Bloom | | ○ | ○ | ○ | ○ | ○ | ○ | ○ | ○ | ○ | ○ |
| | Peel strength (N/cm) | ABS [7] | 49 | 52 | 41 | 46 | 49 | 52 | 40 | 44 | 47 | 49 |
| | Judgment | | ○ | ○ | ○ | ○ | ○ | ○ | ○ | ○ | ○ | ○ |
| | Air tightness (passed/tested) | Polyamide [8] | 50/50 | 50/50 | 50/50 | 50/50 | 50/50 | 50/50 | 50/50 | 50/50 | 50/50 | 50/50 |
| | Judgment | | ○ | ○ | Δ | ○ | ○ | ○ | Δ | ○ | ○ | ○ |
| | Comprehensive evaluation | | ○ | ○ | ○ | ○ | ○ | ○ | ○ | ○ | ○ | ○ |
| | Air tightness (passed/tested) | Polybutylene terephthalate [9] | 50/50 | 50/50 | 50/50 | 50/50 | 50/50 | 50/50 | 43/50 | 46/50 | 49/50 | 50/50 |

[1] ET890 manufactured by BASF Japan Ltd.,
[2] MAVT manufactured by Shikoku Chemicals Corporation,
[3] KBM503 manufactured by Shin-Etsu Chemical Co., Ltd.,
[4] Maleic anhydride manufactured by Nippon Oil & Fats Co., Ltd.,
[5] Blemmer G manufactured by Nippon Oil & Fats Co., Ltd.,
[6] EV170 manufactured by Du Pont-Mitsui Polychemicals Co., Ltd.,
[7] Denka GR-2030G manufactured by Denki Kagaku Kogyo Kabushiki Kaisha,
[8] Reny 1002F manufactured by Mitsubishi Engineering-Plastics Corporation,
[9] NOVADURAN 5010G30X4 manufactured by Mitsubishi Engineering-Plastics Corporation

Examples 21 to 38

A compound of TPU (ET890 manufactured by BASF Japan Ltd.), 3-methacryloxypropyltrimethoxysilane as a silane-containing vinyl monomer (KBM503 manufactured by Shin-Etsu Chemical Co., Ltd.), maleic anhydride manufactured by Nippon Oil & Fats Co., Ltd. as an acid anhydride-containing vinyl monomer, melamine cyanurate as a triazine-based flame retardant (MC-5S manufactured by Sakai Chemical Industry Co., Ltd.) and aromatic condensed phosphoric ester as a phosphorus-based flame retardant (PX-200 manufactured by Daihachi Chemical Industry Co., Ltd) mixed at a compounding ratio shown in Table 2 was made as a sheath using a twin-screw extruder (Laboplastomill, L/D=30, manufactured by Toyo Seiki Seisakusho Co., Ltd.) at a die temperature of 200° C., a screw rotation speed of 150 rpm and a discharge rate of 3 kg/h. EVA (EV170 manufactured by Du Pont-Mitsui Polychemicals Co., Ltd.) was used as an inner insulation, and a cable as shown in FIG. 4 was made by extrusion-coating using a 40 mm-extruder (L/D=24) so that the inner insulation has an outer diameter of 3.4 mm and the sheath has an outer diameter of 4.0 mm. The obtained cable was crosslinked by irradiating an electron beam at a dose of 200 kGy.

The results are shown in Table 2. Examples 21 to 38 in which a flame retardant is added also passed all evaluations, hence, each comprehensive evaluation is also "passed (○)". In addition, the same tendency as Examples 1 to 20 was also observed even in the case of adding a flame retardant, and it is confirmed that the larger the added amount of the vinyl monomer having a functional group within the defined range, the better the adhesion between the sheath and the polyamide resin molded body since the polyamide resin molded body itself was broken in the pulling test of the sheath and the polyamide resin molded body in Examples 25 to 28 and 33 to 38 in which the added amount of the vinyl monomer having a functional group is 20 parts by mass unlike Examples 21 to 24 and 29 to 32 in which the added amount of the vinyl monomer having a functional group such as 3-methacryloxypropyltrimethoxysilane and maleic anhydride is 0.01 parts by mass.

Meanwhile, as for the flame retardancy of the cable, it is confirmed that excellent flame retardancy is exhibited in Examples 21 to 36 in which 30 to 200 parts by mass of flame retardant is added, such that the flame is self-extinguished within 30 seconds after removing the flame in the flame retardant test. Examples 37 and 38 in which the flame was self-extinguished within 60 seconds also exhibit flame retardancy but is slightly inferior to Examples 21 to 36 since the added amount of the flame retardant is small such as 20 parts by mass. This revealed that the more preferable added amount of the flame retardant is not less than 30 parts by mass and not more than 200 parts by mass per 100 parts by mass of TPU.

Also in Examples 21 to 38, polybutylene terephthalate ((GF=30%), NOVADURAN 5010G30X4 manufactured by Mitsubishi Engineering-Plastics Corporation) was used as a resin molded body covering the end of cable instead of using a polyimide resin. 50 out of 50 samples passed the air tightness test and it was confirmed that air tightness equivalent to the case of covering by the polyamide resin molded body was exhibited.

TABLE 2

(Unit of blending amount: parts by mass)

| | Items | | 21 | 22 | 23 | 24 | 25 | 26 | 27 | 28 | 29 |
|---|---|---|---|---|---|---|---|---|---|---|---|
| Sheath | TPU [1] | | 100 | 100 | 100 | 100 | 100 | 100 | 100 | 100 | 100 |
| | 3-methacryloxypropyltrimethoxy-silane [3] | | 0.01 | 0.01 | 0.01 | 0.01 | 20 | 20 | 20 | 20 | |
| | Maleic anhydride [4] | | | | | | | | | | 0.01 |
| | Melamine cyanurate [10] | | 30 | 200 | | | 30 | 200 | | | 30 |
| | Aromatic condensed phosphoric ester [11] | | | | 30 | 200 | | | 30 | 200 | |
| Inner insulation | EVA [6] | | 100 | 100 | 100 | 100 | 100 | 100 | 100 | 100 | 100 |
| | Irradiance level (kGy) | | 200 | 200 | 200 | 200 | 200 | 200 | 200 | 200 | 200 |
| Evaluation | Heat resistance (presence of melting, cracks) | | ○ | ○ | ○ | ○ | ○ | ○ | ○ | ○ | ○ |
| | Gel fraction (%) | | 75 | 70 | 74 | 71 | 70 | 68 | 71 | 69 | 76 |
| | Bloom | | ○ | ○ | ○ | ○ | ○ | ○ | ○ | ○ | ○ |
| | Flame retardancy (second) | | 21 | 1 | 18 | 0 | 20 | 1 | 20 | 0 | 1 |
| | Peel strength (N/cm) | ABS [7] | 45 | 44 | 40 | 43 | 45 | 48 | 41 | 46 | 49 |
| | Judgment | | ○ | ○ | ○ | ○ | ○ | ○ | ○ | ○ | ○ |
| | Air tightness (passed/tested) | Polyamide [8] | 50/50 | 50/50 | 50/50 | 50/50 | 50/50 | 50/50 | 50/50 | 50/50 | 50/50 |
| | Judgment | | Δ | Δ | Δ | Δ | ○ | ○ | ○ | ○ | Δ |
| | Comprehensive evaluation | | ○ | ○ | ○ | ○ | ○ | ○ | ○ | ○ | ○ |
| | Air tightness (passed/tested) | Polybutylene terephthalate [9] | 50/50 | 50/50 | 50/50 | 50/50 | 50/50 | 50/50 | 50/50 | 50/50 | 50/50 |

(Unit of blending amount: parts by mass)

| | Items | | 30 | 31 | 32 | 33 | 34 | 35 | 36 | 37 | 38 |
|---|---|---|---|---|---|---|---|---|---|---|---|
| Sheath | TPU [1] | | 100 | 100 | 100 | 100 | 100 | 100 | 100 | 100 | 100 |
| | 3-methacryloxypropyltrimethoxy-silane [3] | | | | | | | | | | |
| | Maleic anhydride [4] | | 0.01 | 0.01 | 0.01 | 20 | 20 | 20 | 20 | 20 | 20 |
| | Melamine cyanurate [10] | | 200 | | | 30 | 200 | | | 20 | |
| | Aromatic condensed phosphoric ester [11] | | | 30 | 200 | | | 30 | 200 | | 20 |

TABLE 2-continued

| | | | | | | | | | | |
|---|---|---|---|---|---|---|---|---|---|---|
| Inner insulation | EVA [6] | 100 | 100 | 100 | 100 | 100 | 100 | 100 | 100 | 100 |
| Irradiance level (kGy) | | 200 | 200 | 200 | 200 | 200 | 200 | 200 | 200 | 200 |
| Evaluation | Heat resistance (presence of melting, cracks) | ○ | ○ | ○ | ○ | ○ | ○ | ○ | ○ | ○ |
| | Gel fraction (%) | 71 | 75 | 72 | 71 | 69 | 72 | 70 | 71 | 72 |
| | Bloom | ○ | ○ | ○ | ○ | ○ | ○ | ○ | ○ | ○ |
| | Flame retardancy (second) | 1 | 18 | 0 | 18 | 1 | 17 | 0 | 50 | 44 |
| | Peel strength ABS [7] (N/cm) | 52 | 41 | 46 | 49 | 52 | 40 | 44 | 50 | 49 |
| | Judgment | ○ | ○ | ○ | ○ | ○ | ○ | ○ | ○ | ○ |
| | Air tightness Polyamide [8] (passed/tested) | 50/50 | 50/50 | 50/50 | 50/50 | 50/50 | 50/50 | 50/50 | 50/50 | 50/50 |
| | Judgment | Δ | Δ | Δ | ○ | ○ | ○ | ○ | ○ | ○ |
| | Comprehensive evaluation | ○ | ○ | ○ | ○ | ○ | ○ | ○ | ○ | ○ |
| | Air tightness Polybutylene (passed/tested) terephthalate [9] | 50/50 | 50/50 | 50/50 | 50/50 | 50/50 | 50/50 | 50/50 | 50/50 | 50/50 |

[1] ET890 manufactured by BASF Japan Ltd.,
[3] KBM503 manufactured by Shin-Etsu Chemical Co., Ltd.,
[4] Maleic anhydride manufactured by Nippon Oil & Fats Co., Ltd.,
[6] EV170 manufactured by Du Pont-Mitsui Polychemicals Co., Ltd.,
[7] Denka GR-2030G manufactured by Denki Kagaku Kogyo Kabushiki Kaisha,
[8] Reny 1002F manufactured by Mitsubishi Engineering-Plastics Corporation,
[9] NOVADURAN 5010G30X4 manufactured by Mitsubishi Engineering-Plastics Corporation,
[10] MC-5S manufactured by Sakai Chemical Industry Co., Ltd.,
[11] PX-200 manufactured by Daihachi Chemical Industry Co., Ltd.

Comparative Example 1

A cable in which TPU is use for a sheath and EVA is used for an inner insulation was made at an irradiation dose of 0 kGy.

The results are shown in Table 3. Bloom did not occur on the outer appearance of the sheath, and the sheath has a gel fraction of 0 and is not crosslinked since an electron beam was not irradiated. In addition, the sheath adheres to the polyamide resin molded body and air tightness was sufficient but the sheath was melted in the heat resistance test since it was not crosslinked, and it was thus judged as "failed (X)".

Comparative Example 2

A cable in which TPU is use for a sheath and EVA is used for an inner insulation was made at an irradiation dose of 200 kGy.

As a result, as shown in Table 3, the bloom on the outer layer was not observed and heat resistance was sufficient. However, since the vinyl monomer having a functional group was not added, the peel strength was 22 N/cm which is below the reference value and the air tightness was not exhibited such that 0 out of 50 samples passed the test of air tightness with respect to the polyamide resin molded body, hence, the comprehensive evaluation is "failed (X)".

Comparative Example 3

A cable in which 100 parts by mass of TPU and 0.009 parts by mass of 2,4-diamino-6-methacryloyloxyethyl-s-triazine as an amine-containing vinyl monomer are used for a sheath and EVA is used for an inner insulation was made at an irradiation dose of 200 kGy.

As a result, as shown in Table 3, the bloom on the outer layer was not observed and heat resistance was sufficient. However, since the added amount of the vinyl monomer having a functional group was small such as 0.009 which is below the defined value, the peel strength was 38 N/cm which is below the reference value and the air tightness was poor such that 42 out of 50 samples passed the test of air tightness with respect to the polyamide resin molded body, hence, the comprehensive evaluation is "failed (X)".

Comparative Example 4

A cable in which 100 parts by mass of TPU and 21 parts by mass of 2,4-diamino-6-methacryloyloxyethyl-s-triazine as an amine-containing vinyl monomer are used for a sheath and EVA is used for an inner insulation was made at an irradiation dose of 200 kGy.

As a result, as shown in Table 3, although heat resistance, peel strength and air tightness with respect to the polyamide resin molded body were satisfactory, bloom occurred on the surface of the sheath since the added amount of the 2,4-diamino-6-methacryloyloxyethyl-s-triazine was 21 parts by mass which is more than the defined value, hence, the comprehensive evaluation is "failed (X)".

Comparative Example 5

A cable in which 100 parts by mass of TPU and 0.009 parts by mass of 3-methacryloxypropyltrimethoxysilane as a silane-containing vinyl monomer are used for a sheath and EVA is used for an inner insulation was made at an irradiation dose of 200 kGy.

As a result, as shown in Table 3, the bloom on the outer layer was not observed and heat resistance was sufficient. However, since the added amount of the vinyl monomer having a functional group was small such as 0.009 which is below the defined value, the peel strength was 39 N/cm which is below the reference value and the air tightness was poor such that 40 out of 50 samples passed the test of air tightness with respect to the polyamide resin molded body, hence, the comprehensive evaluation is "failed (X)".

Comparative Example 6

A cable in which 100 parts by mass of TPU and 21 parts by mass of 3-methacryloxypropyltrimethoxysilane as a silane-containing vinyl monomer are used for a sheath and EVA is used for an inner insulation was made at an irradiation dose of 200 kGy.

As a result, as shown in Table 3, although heat resistance, peel strength and air tightness with respect to the polyamide resin molded body were satisfactory, bloom occurred on the surface of the sheath since the added amount of the 3-methacryloxypropyltrimethoxysilane was 21 parts by mass which is more than the defined value, hence, the comprehensive evaluation is "failed (X)".

Comparative Example 7

A cable in which 100 parts by mass of TPU and 0.009 parts by mass of maleic anhydride are used for a sheath and EVA is used for an inner insulation was made at an irradiation dose of 200 kGy.

As a result, as shown in Table 3, the bloom on the outer layer was not observed and heat resistance was sufficient. However, since the added amount of the vinyl monomer having a functional group was small such as 0.009 which is below the defined value, the peel strength was 39 N/cm which is below the reference value and the air tightness was poor such that 43 out of 50 samples passed the test of air tightness with respect to the polyamide resin molded body, hence, the comprehensive evaluation is "failed (X)".

Comparative Example 8

A cable in which 100 parts by mass of TPU and 21 parts by mass of maleic anhydride are used for a sheath and EVA is used for an inner insulation was made at an irradiation dose of 200 kGy.

As a result, as shown in Table 3, although heat resistance, peel strength and air tightness with respect to the polyamide resin molded body were satisfactory, bloom occurred on the surface of the sheath since the added amount of the maleic anhydride was 21 parts by mass which is more than the defined value, hence, the comprehensive evaluation is "failed (X)".

Comparative Example 9

A cable in which 100 parts by mass of TPU and 0.009 parts by mass of glycidyl methacrylate are used for a sheath and EVA is used for an inner insulation was made at an irradiation dose of 200 kGy.

As a result, as shown in Table 3, the bloom on the outer layer was not observed and heat resistance was sufficient. However, since the added amount of the vinyl monomer having a functional group was small such as 0.009 which is below the defined value, the peel strength was 38 N/cm which is below the reference value and the air tightness was poor such that 38 out of 50 samples passed the test of air tightness with respect to the polyamide resin molded body, hence, the comprehensive evaluation is "failed (X)".

Comparative Example 10

A cable in which 100 parts by mass of TPU and 21 parts by mass of glycidyl methacrylate are used for a sheath and EVA is used for an inner insulation was made at an irradiation dose of 200 kGy.

As a result, as shown in Table 3, although heat resistance, peel strength and air tightness with respect to the polyamide resin molded body were satisfactory, bloom occurred on the surface of the sheath since the added amount of the glycidyl methacrylate was 21 parts by mass which is more than the defined value, hence, the comprehensive evaluation is "failed (X)".

Comparative Example 11

A cable in which 100 parts by mass of TPU, 10 parts by mass of 3-methacryloxypropyltrimethoxysilane and 210 parts by mass of melamine cyanurate are used for a sheath and EVA is used for an inner insulation was made at an irradiation dose of 200 kGy.

As a result, as shown in Table 3, although heat resistance, air tightness with respect to the polyamide resin molded body and flame retardancy were satisfactory, bloom of the flame retardant occurred on the surface of the sheath since the amount of the flame retardant added to the resin composition constituting the sheath was more than the defined value, hence, judged as "failed (X)". Accordingly, the comprehensive evaluation is also "failed (X)".

Comparative Example 12

A cable in which 100 parts by mass of TPU, 10 parts by mass of 3-methacryloxypropyltrimethoxysilane as a silane-containing vinyl monomer and 210 parts by mass of aromatic condensed phosphoric ester as a phosphorus-based flame are used for a sheath and EVA is used for an inner insulation was made at an irradiation dose of 200 kGy.

As a result, as shown in Table 3, although heat resistance, air tightness with respect to the polyamide resin molded body and flame retardancy were satisfactory, bloom of the flame retardant occurred on the surface of the sheath since the amount of the flame retardant added to the resin composition constituting the sheath was more than the defined value, hence, judged as "failed (X)". Accordingly, the comprehensive evaluation is also "failed (X)".

Comparative Example 13

A cable in which 100 parts by mass of TPU, 10 parts by mass of 3-methacryloxypropyltrimethoxysilane and 100 parts by mass of magnesium hydroxide as a flame retardant are used for a sheath and EVA is used for an inner insulation was made at an irradiation dose of 200 kGy.

As a result, as shown in Table 3, although heat resistance, flame retardancy and bloom were satisfactory, the metal hydrate was decomposed and foamed by heat during molding since the metal hydrate was used as a flame retardant added to the resin composition constituting the sheath, which created a gap between the sheath and the polyamide resin molded body and resulted in that few samples passed the air tightness test such that 5 out of 50 samples passed the test, hence, the comprehensive evaluation is also "failed (X)".

Also in Comparative Examples 1 to 13, polybutylene terephthalate was used as a resin molded body covering the end of cable instead of using a polyimide resin. 40 out of 50 samples passed the air tightness test in the Comparative Examples 1, 4, 6 to 8 and 10 to 12, which shows that air tightness is also exhibited even in the case of using polybutylene terephthalate as a resin molded body if the added amount of the vinyl monomer is increased, however, there is a problem that bloom occurs on the surface of the outer layer and it is thus not suitable.

TABLE 3

| | Items | | (Unit of blending amount: parts by mass) Comparative Examples | | | | | | |
|---|---|---|---|---|---|---|---|---|---|
| | | | 1 | 2 | 3 | 4 | 5 | 6 | 7 |
| Sheath | TPU [1) | | 100 | 100 | 100 | 100 | 100 | 100 | 100 |
| | 2,4-diamino-6-methacryloyloxyethyl-s-triazine [2) | | | | 0.009 | 21 | | | |
| | 3-methacryloxypropyltrimethoxysilane [3) | | | | | | 0.009 | 21 | |
| | Maleic anhydride [4) | | | | | | | | 0.009 |
| | Glycidyl methacrylate [5) | | | | | | | | |
| | Melamine cyanurate [10) | | | | | | | | |
| | Aromatic condensed phosphoric ester [11) | | | | | | | | |
| | Magnesium hydroxide | | | | | | | | |
| Inner insulation | EVA [6) | | 100 | 100 | 100 | 100 | 100 | 100 | 100 |
| Irradiance level (kGy) | | | 0 | 200 | 200 | 200 | 200 | 200 | 200 |
| Evaluation | Heat resistance (presence of melting, cracks) | | X (melted) | ○ | ○ | ○ | ○ | ○ | ○ |
| | Gel fraction (%) | | 0 | 83 | 78 | 70 | 79 | 71 | 78 |
| | Bloom | | ○ | ○ | ○ | X | ○ | X | ○ |
| | Flame retardancy (second) | | | | | | | | |
| | Peel strength (N/cm) | ABS [7) | 57 | 22 | 38 | 50 | 39 | 53 | 39 |
| | Judgment | | ○ | X | X | ○ | X | ○ | X |
| | Air tightness (passed/tested) | Polyamide [8) | 50/50 | 0/50 | 42/50 | 50/50 | 40/50 | 50/50 | 43/50 |
| | Judgment | | ○ | X | X | Δ | X | Δ | X |
| | Comprehensive Evaluation | | X | X | X | X | X | X | X |
| | Air tightness (passed/tested) | Polybutylene terephthalate [9) | 50/50 | 0/50 | 37/50 | 50/50 | 39/50 | 50/50 | 43/50 |

| | Items | | (Unit of blending amount: parts by mass) Comparative Examples | | | | | |
|---|---|---|---|---|---|---|---|---|
| | | | 8 | 9 | 10 | 11 | 12 | 13 |
| Sheath | TPU [1) | | 100 | 100 | 100 | 100 | 100 | 100 |
| | 2,4-diamino-6-methacryloyloxyethyl-s-triazine [2) | | | | | | | |
| | 3-methacryloxypropyltrimethoxysilane [3) | | | | | 10 | 10 | 10 |
| | Maleic anhydride [4) | | 21 | | | | | |
| | Glycidyl methacrylate [5) | | | 0.009 | 21 | | | |
| | Melamine cyanurate [10) | | | | | 210 | | |
| | Aromatic condensed phosphoric ester [11) | | | | | | 210 | |
| | Magnesium hydroxide | | | | | | | 100 |
| Inner insulation | EVA [6) | | 100 | 100 | 100 | 100 | 100 | 100 |
| Irradiance level (kGy) | | | 200 | 200 | 200 | 200 | 200 | 200 |
| Evaluation | Heat resistance (presence of melting, cracks) | | ○ | ○ | ○ | ○ | ○ | ○ |
| | Gel fraction (%) | | 72 | 79 | 70 | 68 | 68 | 70 |
| | Bloom | | X | ○ | X | X | X | ○ |
| | Flame retardancy (second) | | | | | 0 | 0 | 2 |
| | Peel strength (N/cm) | ABS [7) | 53 | 38 | 50 | 48 | 47 | 10 |
| | Judgment | | ○ | X | ○ | ○ | ○ | X |
| | Air tightness (passed/tested) | Polyamide [8) | 50/50 | 38/50 | 50/50 | 50/50 | 50/50 | 5/50 |
| | Judgment | | Δ | X | Δ | Δ | Δ | X |
| | Comprehensive Evaluation | | X | X | X | X | X | X |
| | Air tightness (passed/tested) | Polybutylene terephthalate [9) | 50/50 | 31/50 | 50/50 | 50/50 | 50/50 | 3/50 |

[1) ET890 manufactured by BASF Japan Ltd.,
[2) MAVT manufactured by Shikoku Chemicals Corporation,
[3) KBM503 manufactured by Shin-Etsu Chemical Co., Ltd.,
[4) Maleic anhydride manufactured by Nippon Oil & Fats Co., Ltd.,
[5) Blemmer G manufactured by Nippon Oil & Fats Co., Ltd.,
[6) EV170 manufactured by Du Pont-Mitsui Polychemicals Co., Ltd.,
[7) Denka GR-2030G manufactured by Denki Kagaku Kogyo Kabushiki Kaisha,
[8) Reny 1002F manufactured by Mitsubishi Engineering-Plastics Corporation,
[9) NOVADURAN 5010G30X4 manufactured by Mitsubishi Engineering-Plastics Corporation,
[10) MC-5S manufactured by Sakai Chemical Industry Co., Ltd.,
[11) PX-200 manufactured by Daihachi Chemical Industry Co., Ltd.

As described in Examples and Comparative Examples, it is not possible to obtain sufficient air tightness with respect to the polyamide resin molded body when the vinyl monomer is not added to TPU as is in Comparative Example 2 or when the amount of the vinyl monomer added to TPU is less than 0.01 parts by mass as are in Comparative Examples 3, 5, 7 and 9 while bloom occurs on the surface of the sheath when the added amount of the vinyl monomer is more than 20 parts by mass as are in Comparative Examples 4, 6, 8 and 10. In addition, when the sheath as a coating formed of the resin composition is not exposed to an electron beam as is in Comparative Example 1, the sheath melts when heated due to lack of heat resistance since the sheath is not crosslinked and it is not possible to maintain the shape of the cable. Therefore, by using the crosslinked resin composition, in which a resin composition containing not less than 0.01 parts by mass and not more than 20 parts by mass of vinyl monomer having a functional group per 100 parts by mass of TPU is crosslinked by electron beam irradiation, as the outermost insulation of the wire or the sheath of the cable, it is possible to improve the air tightness with respect to the polyamide resin molded body which covers the end of the wire or cable. Furthermore, in addition to the above-mentioned effect, it is possible to impart flame retardancy by adding not less than 20 parts by mass and not more than 200 parts by mass of a triazine-based flame retardant or a phosphorus-based flame retardant to the resin composition.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A crosslinked resin composition, comprising:
   a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy,
   wherein the resin composition is crosslinked by an electron beam irradiation.

2. The crosslinked resin composition according to claim 1, wherein the resin composition further comprises a triazine-based or phosphorus-based flame retardant.

3. The crosslinked resin composition according to claim 2, wherein the flame retardant is contained at a rate of not less than 20 parts by mass and not more than 200 parts by mass relative to 100 parts by mass of the thermoplastic polyurethane in the resin composition.

4. The crosslinked resin composition according to claim 2, wherein the triazine-based flame retardant comprises melamine cyanurate.

5. A wire, comprising:
   an insulation on an outer periphery of a conductor;
   wherein the insulation at an outermost layer of the wire comprises a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy, and
   wherein the resin composition is crosslinked by an electron beam irradiation.

6. The wire according to claim 5, wherein the resin composition further comprises a triazine-based or phosphorus-based flame retardant.

7. The wire according to claim 6, wherein the flame retardant is contained at a rate of not less than 20 parts by mass and not more than 200 parts by mass relative to 100 parts by mass of the thermoplastic polyurethane in the resin composition.

8. A cable, comprising:
   a sheath on an outer periphery of a wire core formed by twisting a plurality of wires each comprising a conductor and an insulation thereon,
   wherein the sheath at an outermost layer of the cable comprises a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy, and
   wherein the resin composition is crosslinked by an electron beam irradiation.

9. The cable according to claim 8, wherein the resin composition further comprises a triazine-based or phosphorus-based flame retardant.

10. The cable according to claim 9, wherein the flame retardant is contained at a rate of not less than 20 parts by mass and not more than 200 parts by mass relative to 100 parts by mass of the thermoplastic polyurethane in the resin composition.

11. A molded wire, comprising:
    a wire comprising an insulation on an outer periphery of a conductor; and
    a resin molded body at a terminal of the wire,
    wherein the insulation at an outermost layer of the wire comprises a resin composition comprising not less than 0.01 parts by mass and not more than 20 parts by mass of a vinyl monomer relative to 100 parts by mass of a thermoplastic polyurethane, the vinyl monomer having a molecular structure comprising at least one functional group of acid anhydride, silane, amine and epoxy,
    wherein the resin composition is crosslinked by an electron beam irradiation.

12. The molded wire according to claim 11, wherein the vinyl monomer has a molecular structure comprising a functional group of an acid anhydride or silane, and
    wherein the resin molded body comprises a polybutylene terephthalate resin.

13. The molded wire according to claim 11, wherein the resin composition further comprises a triazine-based or phosphorus-based flame retardant.

14. The molded wire according to claim 13, wherein the flame retardant is contained at a rate of not less than 20 parts by mass and not more than 200 parts by mass relative to 100 parts by mass of the thermoplastic polyurethane in the resin composition.

* * * * *